(12) United States Patent
Rueger et al.

(10) Patent No.: US 10,586,573 B2
(45) Date of Patent: Mar. 10, 2020

(54) TAPE DATA PROTECTION BY CLIMATE LABEL VERIFICATION

(71) Applicant: INTERNATIONAL BUSINESS MACHINES CORPORATION, Armonk, NY (US)

(72) Inventors: Erik Rueger, Ockenheim (DE); Markus Schäfer, Heiligenmoschel (DE); Stefan Wiedemann, Kaiserslautern (DE); Robert Beiderbeck, Wassenberg (DE); Ole Asmussen, Henstedt-Ulzburg (DE)

(73) Assignee: International Business Machines Corporation, Armonk, NY (US)

( * ) Notice: Subject to any disclaimer, the term of this patent is extended or adjusted under 35 U.S.C. 154(b) by 131 days.

(21) Appl. No.: 15/907,563

(22) Filed: Feb. 28, 2018

(65) Prior Publication Data

US 2019/0267045 A1 Aug. 29, 2019

(51) Int. Cl.
| | |
|---|---|
| *G11B 33/10* | (2006.01) |
| *G01K 11/12* | (2006.01) |
| *G06K 19/06* | (2006.01) |
| *G11B 33/02* | (2006.01) |
| *G11B 33/14* | (2006.01) |

(52) U.S. Cl.
CPC ............ *G11B 33/10* (2013.01); *G01K 11/12* (2013.01); *G06K 19/0615* (2013.01); *G11B 33/022* (2013.01); *G11B 33/144* (2013.01); *G06K 19/06028* (2013.01)

(58) Field of Classification Search
CPC .. G11B 33/10; G11B 33/022; G06K 19/0615; G06K 19/06028; G01K 11/12
See application file for complete search history.

(56) References Cited

U.S. PATENT DOCUMENTS

| | | | |
|---|---|---|---|
| 6,661,596 B2 | 12/2003 | Chliwnyj et al. | |
| 6,676,026 B1 * | 1/2004 | McKinley | G11B 15/6835 165/80.3 |

(Continued)

FOREIGN PATENT DOCUMENTS

GB 2380046 A 3/2003

OTHER PUBLICATIONS

Van Bogart, "How Can You Prevent Magnetic Tape from Degrading Prematurely?", Council on Library and Information Resources, Jun. 1995, pp. 1-7.

(Continued)

*Primary Examiner* — William A. Rivera
(74) *Attorney, Agent, or Firm* — Jordan T. Schiller

(57) ABSTRACT

A tape cartridge for a magnetic tape may be provided. The tape cartridge includes a magnetic tape surrounded by a housing and a temperature indicator that signals a temperature of the tape cartridge, for example, by a thermochromic label. Additionally, a system for tape cartridge data protection that interoperates with the tape cartridge is provided. The system includes a storage for holding a tape cartridge, a sensor that detects temperature information from the temperature indicator of the tape cartridge, and a control unit for controlling an actuator that performs an action depending on the detected temperature information. Furthermore, a method for operating the system for tape cartridge data protection is proposed.

16 Claims, 7 Drawing Sheets

(56) References Cited

U.S. PATENT DOCUMENTS

| | | | | |
|---|---|---|---|---|
| 7,106,199 | B2* | 9/2006 | Lee | G06K 19/0717 |
| | | | | 235/492 |
| 7,474,497 | B2* | 1/2009 | Jesionowski | G11B 15/6835 |
| | | | | 360/92.1 |
| 7,961,419 | B2* | 6/2011 | Suzuki | G06F 1/184 |
| | | | | 360/69 |
| 9,916,871 | B1* | 3/2018 | Miranda Gavillan | |
| | | | | G11B 33/144 |
| 10,303,376 | B2* | 5/2019 | Miranda Gavillan | |
| | | | | G06F 3/0613 |
| 2003/0067703 | A1 | 4/2003 | Holmes et al. | |
| 2006/0077585 | A1 | 4/2006 | Larson | |
| 2006/0177922 | A1* | 8/2006 | Shamah | B01L 9/523 |
| | | | | 435/286.2 |

OTHER PUBLICATIONS

IBM Knowledge Center, "Environmental and shipping specifications for LTO tape cartridges," https://www.ibm.com/support/knowledgecenter/en/STCMML8/com.ibm.storage.ts3500.doc/jpg_3584_meesi.html, Printed on Feb. 20, 2018, pp. 1-3.

* cited by examiner

TAPE DATA PROTECTION BY CLIMATE LABEL VERIFICATION

FIELD OF THE INVENTION

The invention relates generally to a tape cartridge for a magnetic tape, and more specifically, to a tape cartridge equipped with a thermochromic label. The invention relates further to a system for tape cartridge data protection, a method for operating the system for tape cartridge data protection and a computer program product.

BACKGROUND

Using magnetic tapes as backup storage continues to be popular in large data centers. It also turns out that more and more cloud service providers are using tape storage to take advantage of the magnetic tape, such as high-capacity, good performance, low-power consumption, low-cost per gigabyte, removable and portable storage units with very good data protection (e.g., encryption). More and more cloud service providers are introducing magnetic tapes as an "on boarding" tool or an "exit strategy" tool for on-site data centers. For this, existing data are stored on magnetic tapes, put into a shipping box and shipped from an on-site data center to the cloud service provider or, at the end of a service engagement, shipped back to the departing customer.

Additionally, critical data can also be stored off-site in special secured locations, like atomic shelters. Furthermore, major cloud service providers try to run their data centers in low-cost countries with, more or less, free cooling for the data center. The outside air temperature may be in the range used to cool down the data center. This method is less expensive if compared to a data center in traditional locations using classical cooling with costly air conditions.

Free cooled data centers may thus operate at higher temperature and higher humidity levels. However, such temperature and/or humidity levels may not meet requirements for tape media and tape drives such that additional measures have to be taken in order to stay within the specifications for a safe operation of magnetic tape cartridges.

It is known that tests with integrated coolers in tape libraries may show hotspots in certain areas within the frame of the tape library system. Those zones evince different temperature/humidity values, especially, when the tape library was open for service. Tape cartridges stored outside of a controlled environment/data center can deviate from specifications in regard to temperature and humidity. Assuming that one of those tape cartridges will be inserted into an I/O station of the tape library, they may thus not meet the operation specifications. If such tape media gets loaded with temperature/humidity levels that deviate from specifications, the data on the magnetic tape can be destroyed and read/write head elements may be damaged, for example by corrosion.

SUMMARY

According to one aspect of the present invention, a tape cartridge for a magnetic tape may be provided. The tape cartridge may comprise a magnetic tape surrounded by a housing and a temperature indicator that signals a temperature of the tape cartridge.

According to another aspect of the present invention, a system for tape cartridge data protection and a method for operating a system for tape cartridge data protection may be provided. The system for tape cartridge data protection may interoperate with a tape cartridge. The tape cartridge may comprise a magnetic tape surrounded by a housing and a temperature indicator that signals a temperature of the tape cartridge. The system may comprise a storage for holding a tape cartridge, a sensor that detects temperature information from the temperature indicator of the tape cartridge, and a control unit for controlling an actuator that performs an action depending on the detected temperature information.

According to a further aspect of the present invention, a method for operating a system for tape cartridge data protection may be provided. The system to be operated may interoperate with a tape cartridge. The tape cartridge may comprise a magnetic tape surrounded by a housing and a temperature indicator that signals a temperature of the tape cartridge. The system may comprise a storage for holding a tape cartridge, a sensor that detects temperature information from the temperature indicator of the tape cartridge, and a control unit of an actuator that performs an action depending on the detected temperature information.

The method may comprise selecting a cartridge by the actuator controlled by the control unit, detecting a temperature of the cartridge by the sensor, upon the temperature being in a predefined temperature range, moving the cartridge into a tape drive, and upon the temperature being outside the predefined temperature range, moving the cartridge into a climate chamber.

Furthermore, embodiments may take the form of a related computer program product, accessible from a computer-usable or computer-readable medium providing program code for use, by or in connection with a computer or any instruction execution system. For the purpose of this description, a computer-usable or computer-readable medium may be any apparatus that may contain means for storing, communicating, propagating or transporting the program for use, by or in a connection with the instruction execution system, apparatus, or device.

BRIEF DESCRIPTION OF THE SEVERAL VIEWS OF THE DRAWINGS

It should be noted that embodiments of the invention are described with reference to different subject-matters. In particular, some embodiments are described with reference to method type claims, whereas other embodiments are described with reference to apparatus type claims. However, a person skilled in the art will gather from the above and the following description that, unless otherwise notified, in addition to any combination of features belonging to one type of subject-matter, also any combination between features relating to different subject-matters, in particular, between features of the method type claims, and features of the apparatus type claims, is considered as to be disclosed within this document.

The aspects defined above, and further aspects of the present invention, are apparent from the examples of embodiments to be described hereinafter and are explained with reference to the examples of embodiments, but to which the invention is not limited.

Figure 1:
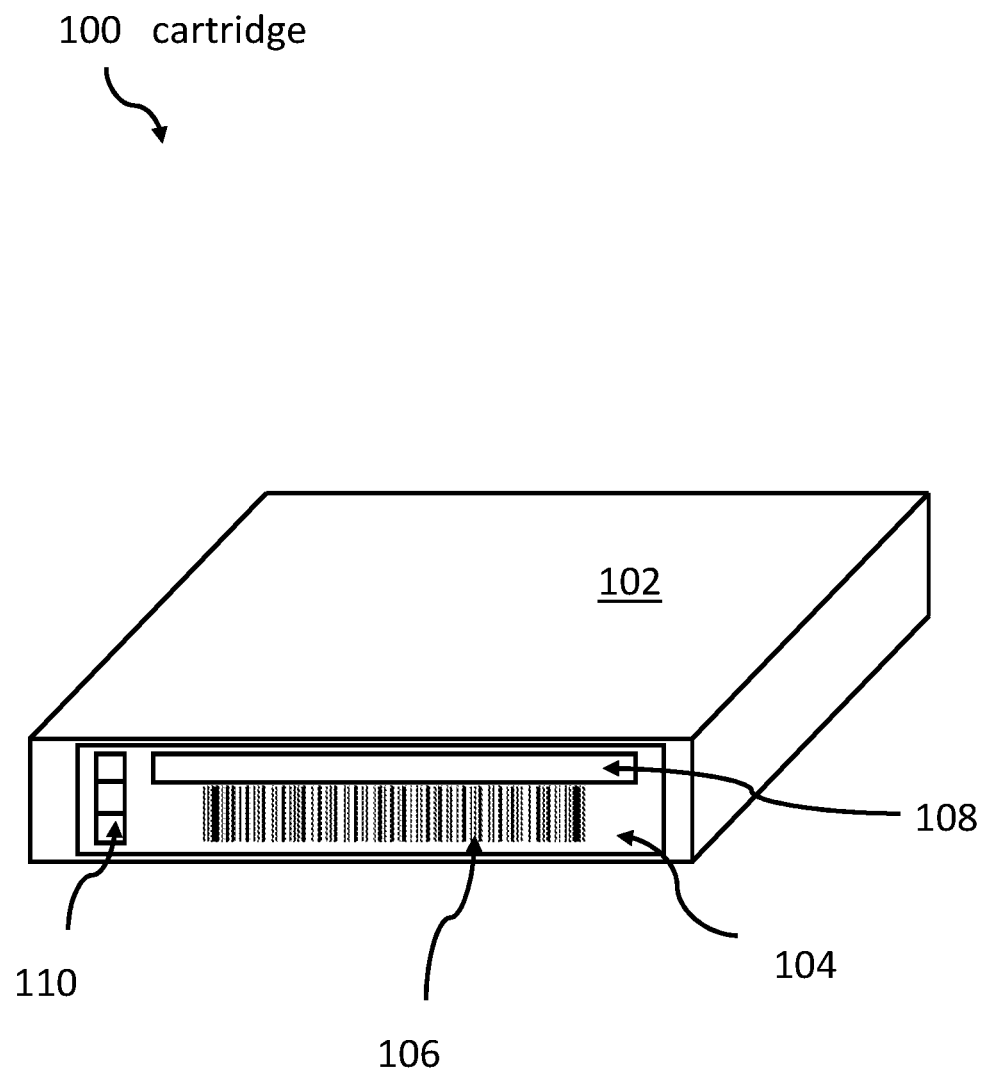

Preferred embodiments of the invention will be described, by way of example only, and with reference to the following drawings:

FIG. 1 shows a block diagram of an embodiment of the inventive tape cartridge for a magnetic tape.

Figure 2:
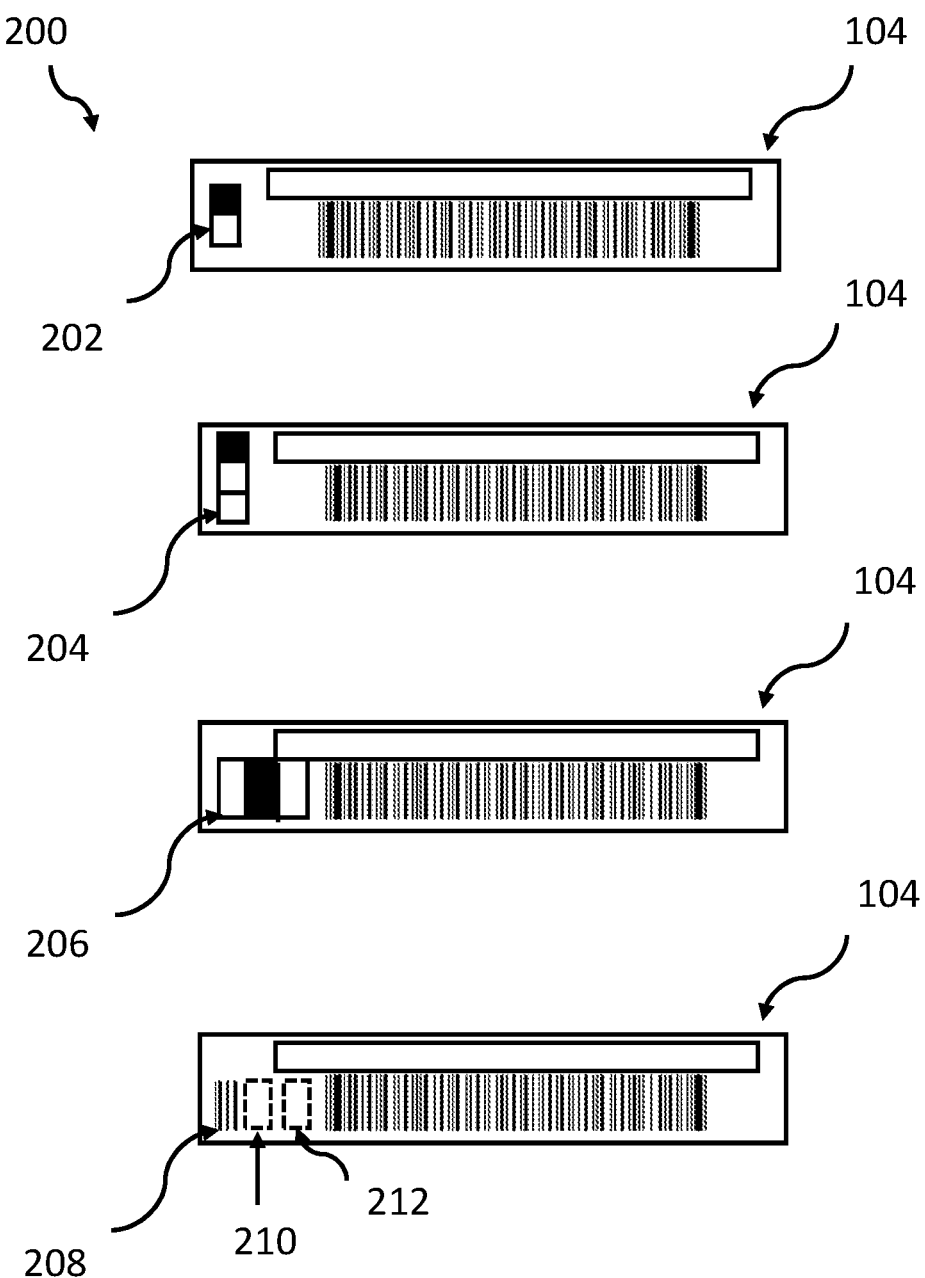

FIG. 2 shows embodiments of alternative layouts of the temperature indicator for the label of the tape cartridge.

Figure 3:
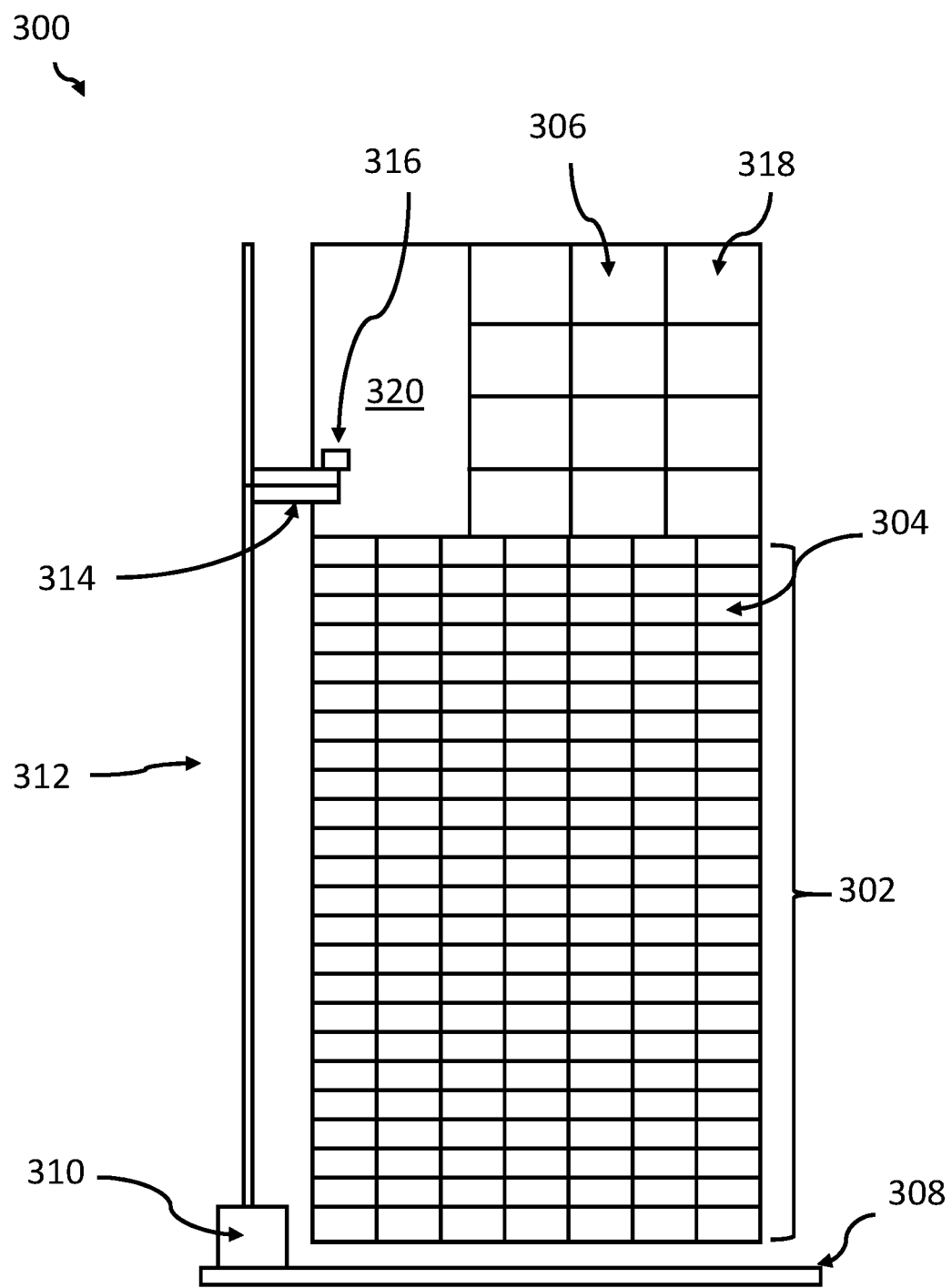

FIG. 3 shows a block diagram of an embodiment of a tape library without a frame.

Figure 4:
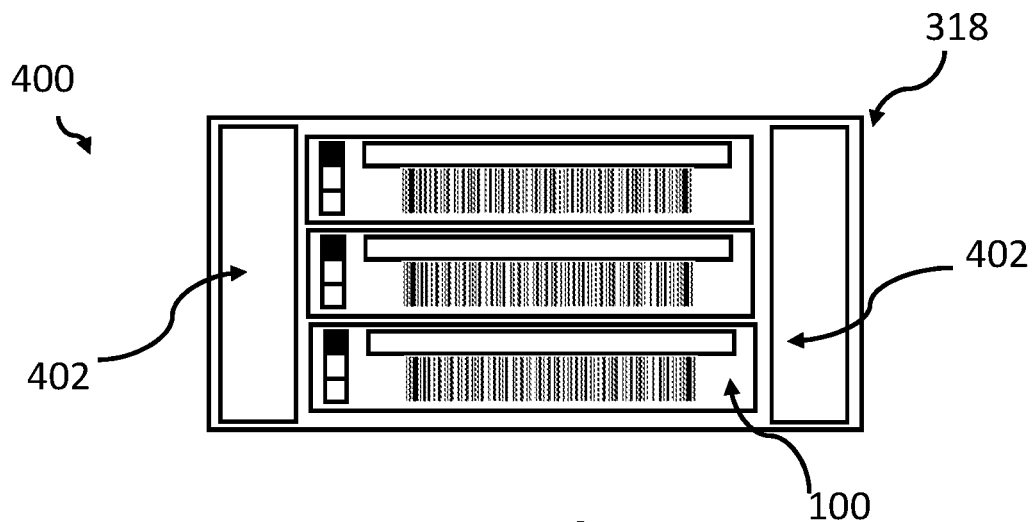

FIG. 4 shows a block diagram of a front view of an embodiment of the climate chamber.

Figure 5:
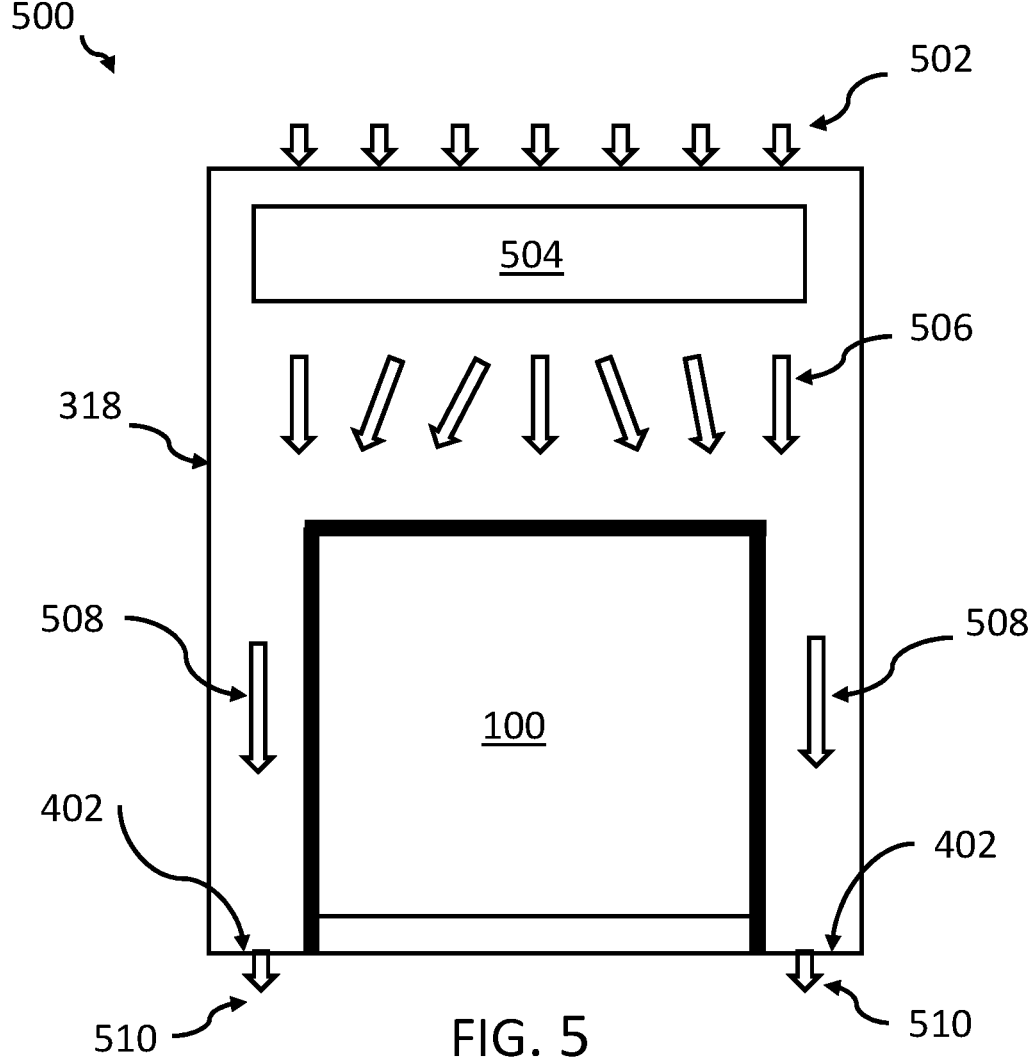

FIG. 5 shows a block diagram of a top view of an embodiment of the (opened) climate chamber.

Figure 6:
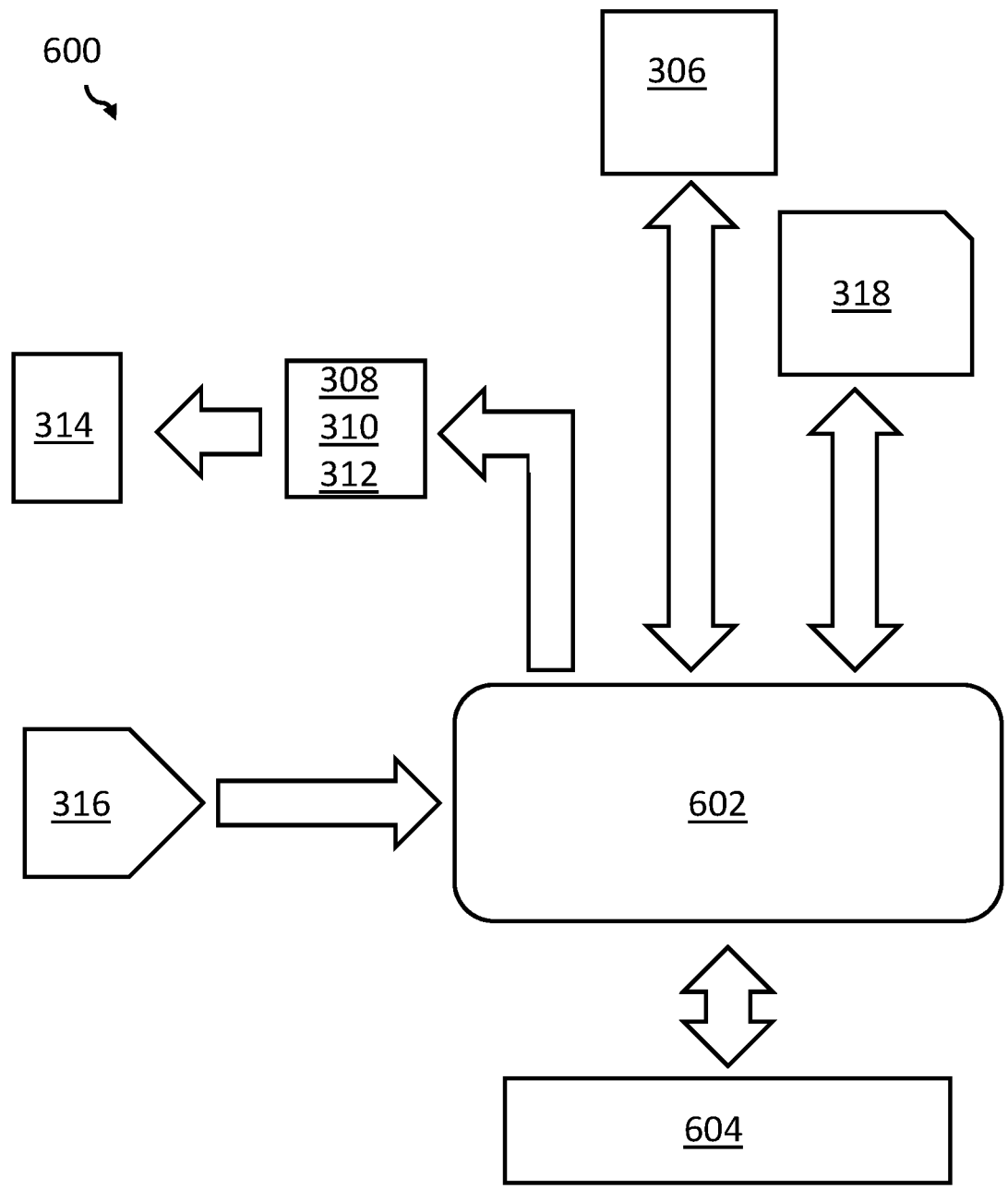

FIG. 6 shows a block diagram of the various components connected to a tape controller.

Figure 7:
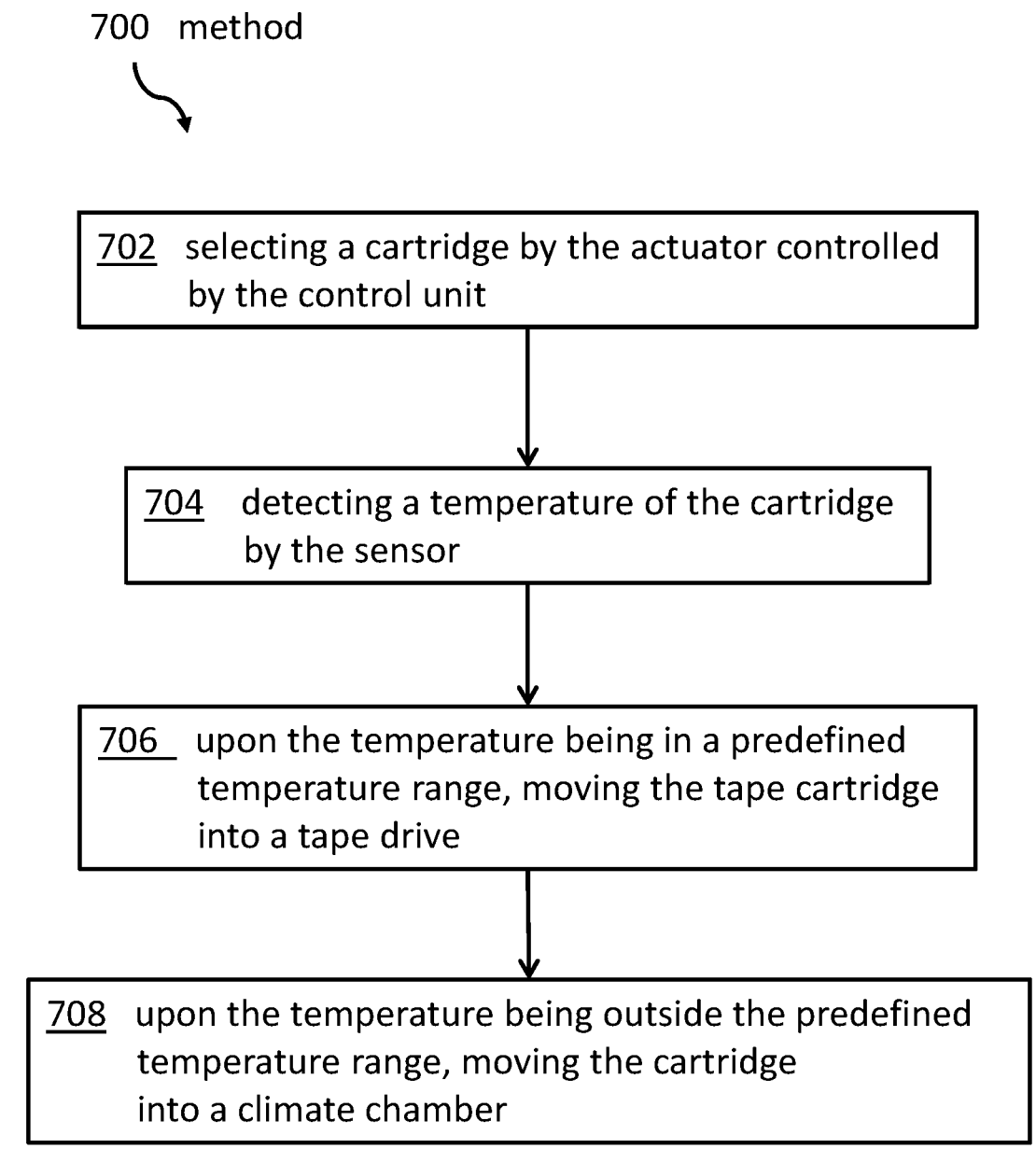

FIG. 7 shows a block diagram of the method for operating a system for tape cartridge data protection.

Figure 8:
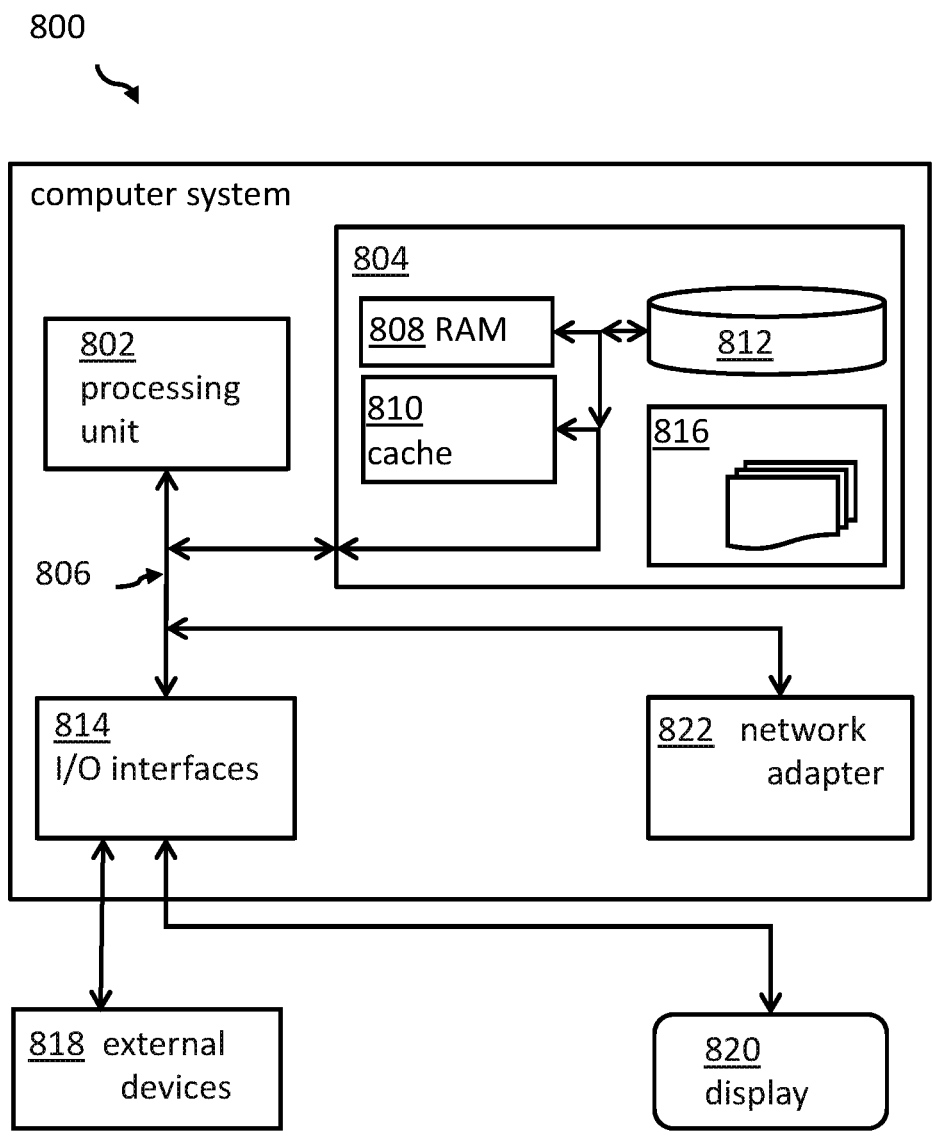

FIG. 8 shows a block diagram of a computing system suitable for executing the method according to claim 7.

DETAILED DESCRIPTION

In the context of this description, the following conventions, terms and/or expressions may be used:

The term "tape cartridge", and in particular a cartridge for a magnetic tape, may denote a tool for storing digital information on a magnetic tape using digital recording. Modern magnetic tapes are most commonly packaged in cartridges and/or cassettes. The device that may perform writing or reading of data may be denoted as a tape drive. For example, a common cassette-based format is Linear Tape-Open (LTO), which comes in a variety of densities and is manufactured by several companies.

The term "temperature indicator" may denote a visible indicator (in special cases, also invisible for the human eye) attached, in particular, to the outside of the cartridge housing of the magnetic tape. It may be a special label or a digital display. The temperature may be coded in different forms, like colors, marks in different predefined positions for defined temperature ranges, numeric characters, and the like.

The term "temperature sensitive sticker" may denote a paper, plastic, or vinyl based typically equipped with a pressure sensitive adhesive on one side. On the other side, the visible side, a temperature indicator of a subject, the sticker is glued to, may be visible. The temperature sensitivity may be based on the effect of the thermochromatic effect. Thermochromics is the property of substances to change color due to a change in temperature. The two common approaches are based on liquid crystals and leuco dyes. A useful feature of a material used for the proposed concept herein may be the reversibility of a color change. Also, thermochromic ink may be used.

The term "barcode" may denote an optical, machine-readable, representation of data. Here, the data may typically describe a characteristic of the tape cartridge it may be attached to. Traditional barcodes may systematically represent data by varying the widths and spacings of parallel lines. However, 2D variants may also be allowable (e.g., QR codes).

The term "humidity sticker" may denote a label to be positioned on a subject, indicating the humidity of the surrounding of the subject. It may be differentiated between two types of humidity stickers: (a) those that change their appearance unchangeably (they indicate the maximum humidity measured in the past); and (b) those that indicate an actual humidity of the surrounding of the subject it may be attached to. The latter version may be the one preferred for the proposed concept herein.

The term "storage" may denote a physical storage like a cabinet for storing a plurality of tape cartridges, as they are used in known tape library systems. Here, a plurality of tape cartridges that are not used are parked in storage spaces from which they may be loaded into a tape drive for reading or writing digital data from/to it.

The term "sensor" may take a plurality of forms in order to recognize, measure, or read codes from indicators. The sensor may be a barcode reader (e.g., a laser-based scanner), a camera (e.g. a charge-couple device (CCD) camera), or a simpler photo-detector that detects different levels of light intensity or brightness.

The term "control unit for controlling an actuator" may denote an electronic module, or a plurality thereof, for controlling a plurality of other units of the tape library, in particular a tape robot, and more specifically, a gripper of the tape robot.

The proposed tape cartridge for a magnetic tape may offer multiple advantages and technical effects, as follows:

It may be ensured that tape cartridges to be inserted into tape drives may also have a temperature, and potentially also a humidity value of the air surrounding the tape cartridge, in a specified range. As an example, the following specifications may be considered:

For a tape drive named IBM 3592, the following values need to be met:

| environmental factor | operating storage | archival storage | shipping |
|---|---|---|---|
| Temperature | 16 to 32° C. | 16 to 25° C. | −23 to 49° C. |
| Relative humidity (noncondensing) | 20 to 80% | 20 to 50% | 5 to 80% |
| Wet pipe maximum temperature | 26° C. | 26° C. | 26° C. |

With the option to keep the temperature of a tape cartridge within the predefined specifications when loading the tape cartridge into a tape drive (e.g., by an acclimatization in a climate chamber), a proper operation without interrupts due to wrongly tempered tape cartridges may be achieved. Read and/or write errors are unnecessary and I/O retries may be avoided if the temperature of the tape cartridge is in the specified range.

It also becomes easier to operate tape libraries in low-cost countries with free cooling where no air conditioning is required. However, in such geographical areas temperature levels vary much more than under the artificial air-conditioned climate of a traditional data center.

It may also be possible to avoid damage, e.g., corrosion, of the read/write tape head due to an adequate temperature and/or humidity values. Overall, the reliability of backup storage based on the magnetic tapes may be enhanced significantly.

In the following, additional embodiments of the cartridge, the system and the method will be described:

According to one advantageous embodiment of the tape cartridge, the temperature indicator may be a temperature sensitive sticker, attached to the tape cartridge. The sticker could be included in the label glued to a front part of the tape cartridge. Alternatively, the temperature sensitive sticker may be separate from the traditional tape cartridge label. The thermo-sensitivity may be based on the thermochromic effect.

According to one advantageous embodiment of the tape cartridge, the temperature sensitive sticker may change its color depending on the temperature and/or wherein the temperature sensitive sticker shows different barcodes depending on the temperature. Thus, the indication of the temperature may be integrated into the layout of the traditional tape cartridge labels. The indication may be achieved by displaying different fields in different colors. For example, red may indicate that the temperature of the tape cartridge is above a predefined operation temperature range;

green may indicate that the tape cartridge is in the predefined operation temperature range; and yellow may indicate that the tape cartridge's temperature is below the predefined operation temperature range. However, any other color combinations may be chosen. Also, a digital signaling may be possible. The indication may also be performed using a QR-code indicating a temperature as precise as +/−1° C. by making areas of the QR-code black or white. The temperature may also be indicated as an Arabic numeral, e.g. 25, signaling that the temperature is 25° C. In such a case, an optical pattern recognition (OCR) system may be used to interpret the meaning of the number.

Using, for example, three fields with different colors or "on"/"off" characteristics due to temperature changes, the color relating to the predefined temperature range of the field may become visible (e.g., red or green or yellow). The other fields may then change their color to black. At temperatures close to a temperature range limit, both colors relating to the range limit may be visible. Thus, also in-between temperatures may be detectable.

According to one permissive embodiment of the tape cartridge, the temperature indicator may signal two statuses (e.g., in-range vs. outside-range) relating to at least two temperature ranges. In such a case, the tape cartridge should always be placed into the climate chamber before placing it into a tape drive if the indicator signals "outside-range".

According to one alternate embodiment of the tape cartridge, the temperature indicator may signal three temperature ranges, for example "too low", "OK", and "too high". This may help to per-temper (pre-heat, pre-cool) the climate chamber or to overheat it in order to bring the temperature of a too cold tape cartridge to a temperature level within the operating specifications. The opposite may be done for too hot tape cartridges.

According to one optional embodiment of the tape cartridge, the cartridge may be of type LTO. This format is most commonly used these days. However, other tape cartridge formats may also be used. One example may be the tape cartridge IBM 3592.

According to another advantageous embodiment, the tape cartridge may also comprise a humidity sticker that signals humidity information. This may also allow taking action based on the humidity the tape cartridge may actually be surrounded by, or may have been surrounded by, in the past. If the humidity of the tape cartridge may actually be outside a predefined operating range, a time in the climate chamber may be required before it may be placed into the tape drive for I/O operations.

According to one preferred embodiment of the system, the sensor may be a camera and/or a barcode reader. Barcode readers are common in traditional tape library systems. In more modern tape library systems, a video camera may be used to determine signs on the label of the tape, for example, barcodes and/or text field or other symbols. Also, by using the sensor for detecting the status of the temperature indicator, an additional device may be used. However, for redundancy reasons, or due to different formats of the traditional marks on the tape cartridge (e.g., barcode) and the temperature indicator, different sensors may also be used.

According to one further embodiment of the system, the storage may be a component of a tape library. The tape library may comprise known elements, like a tape robot and or one/more tape drives.

According to one optional embodiment of the system, the sensor may be integrated into a gripper of the tape library. This way the sensor moves along with the gripper. A detection of tape cartridges and temperature sensor is always possible.

According to one advantageous embodiment, the system may also comprise a climate chamber. The climate chamber may have the same physical dimensions as a tape drive as part of the tape library system. This way, the climate chamber may be integrated into the tape library system in any slot also suitable for a tape drive. Also, the electrical and mechanical connections and connectors may be compatible between the tape drive and the climate chamber. Integrating the climate chamber into the regular set up of the tape library system makes it possible to operate the tape cartridge robot in the same way for handling the climate chamber if compared to a regular tape drive. The physical compatibility may allow climate chambers to be positioned in any slot in which a tape drive would have traditionally been positioned.

According to one preferred embodiment of the system, the actuator may be adapted to move the tape cartridge into the climate chamber if the detected temperature is outside a predefined temperature range. This may allow for, if the temperature of the tape cartridge is too low, the tape cartridge to be heated up in the climate chamber; if the temperature of the tape cartridge is too high, the tape cartridge may be cooled down in the climate chamber.

According to one optional embodiment of the system, the sensor may also detect humidity information from a humidity sticker attached onto the cartridge, and wherein the control unit also performs the action depending on a combination of the detected temperature information and the detected humidity information. It is known that the dew point of the air, surrounding the tape cartridge, depends on the temperature. Thus, a combined assessment of the temperature and the humidity and treatment of the tape cartridge in the climate chamber may be performed.

According to one advantageous embodiment, the method may also comprise determining whether the detected temperature is below or above the predefined temperature range. Thus, an action may be performed depending on a too high or too low temperature of the tape cartridge, as indicated above.

According to one optional embodiment, the method may also comprise, upon receiving an urgency signal, interrupting the moving of the cartridge into a climate chamber, and moving the cartridge directly into the tape drive. Thus, it may be possible to load a cartridge, having a temperature outside the specified operation conditions, into the tape drive immediately without making the detour via the climate chamber. This may only be done in exceptional cases, i.e., if the data may have to be restored immediately due to, for example, an emergency situation in which the date may be needed without a delay.

According to a further embodiment, the method may also comprise determining, after an adaptable delay, whether the temperature of the tape cartridge in the climate chamber is still outside the predefined temperature range. If that is the case, the tape cartridge may have to stay longer in the climate chamber, e.g., for another predetermined amount of time. A sensor for the temperature of the tape cartridge may be installed inside the climate chamber touching the tape cartridge and ensuring that there may be no more functioning of the temperature sensitive sticker. This may enable a redundancy of the temperature measurement and it may also avoid positioning the gripper in front of the climate chamber every time a temperature measurement may be required.

In the following, a detailed description of the figures will be given. All instructions in the figures are schematic.

Firstly, a block diagram of an embodiment of the inventive tape cartridge for a magnetic tape is given. Afterwards, further embodiments, as well as embodiments of the system for tape cartridge data protection and the method for operating a system for tape cartridge data protection, will be described.

FIG. 1 shows a block diagram of an embodiment of the inventive tape cartridge 100 for a magnetic tape (not shown). The tape cartridge comprises the magnetic tape surrounded by a housing 102 and a temperature indicator 110 that signals a temperature of the tape cartridge 102. The temperature indicator 110 is shown as integrated on a label 104 typically attached to the front part of the housing 102. In many cases, such a label 104 comprises a barcode 106 for an automatic identification of the tape cartridge 100. Additionally, the label may also show additional information like a text/character field 108, a company logo, and the like. The temperature indicator 110 is here shown with three different fields, one over the other, indicating three different temperature ranges, e.g., too high/OK/too low. However, this represents only one option for the temperature indicator 110.

FIG. 2 shows embodiments of alternative layouts 200 of the temperature indicator 110 of FIG. 1 for the label 104 of the tape cartridge. For simplicity reasons, the barcode 106 and the optional text field 108 are not shown with reference numerals. They may be placed as shown or in a completely different setup and design. Alternatively, instead of the barcode also one or more two-dimensional graphical codes, e.g. a QR code, may be used.

The temperature indicator 202 is only shown with two different fields. They may mark the two statuses "within temperature range" and "outside temperature range".

Generally, the temperature indicators may be implemented as thermochromic labels as part of the label 104. The color of a field of the thermochromic labels may become visible or may change its appearance depending on the temperature range. In the case of the temperature indicator 202, the dark field, which may be any other color with a prerequisite to be different to the white field in the shown example, may indicate that the temperature is in the predefined temperature range for a proper operation of the tape cartridge. If the temperature may be outside the predefined temperature range for a proper operation, the two fields of the label 202 may alternate its appearance, so that it is visible that the tape cartridge is not meeting requirements for a proper operation. It may not be required that the temperature change is completely digital; depending on a sensor detecting the appearance of the thermochromatic labels/fields also intermediate colors of the fields 202 may be interpretable by the sensor and a related controller.

The temperature indicator 204 of the second tape cartridge 100 shows three different fields for indicating temperature ranges: too high/OK/too long. This may give an indication whether the tape cartridge needs to be heated or cooled down in order to meet the operating specifications.

The temperature indicator 206 shows the thermochromic labels/fields horizontally oriented, side-by-side. It may be clear to a skilled person in the art that the thermochromatic labels/fields may be placed in any orientation in a large variety on the label 104.

The temperature indicator shows an alternative embodiment of the thermochromic labels/fields. In this case, the temperature indicator is implemented as three horizontal short barcodes 208, 210, 212, of which one is visible. The different barcodes 208, 210, 212 may become visible depending on the temperature of the tape cartridge, i.e., the temperature of the label 104. This may have the advantage that the barcode reader used to read the main barcode 206 (compare FIG. 1) may easily extend its detection range to also sense the indicated temperature.

Additionally, a second, comparable set of thermochromatic labels/fields may be included into the label 104 indicating the current humidity and/or humidity levels the tape cartridge has been exposed to in the past. It may also be noted that the thermochromic labels/fields may use wavelength ranges outside the visible spectrum for a human eye, e.g. in the infrared or the ultraviolet spectrum. However, using the visible spectrum has the advantage that also service technicians may see immediately which temperature range (and/or humidity range) the cartridge to be inserted into the tape library (e.g., an I/O slot) may actually have.

FIG. 3 shows a block diagram of an embodiment of a tape library without a frame/chassis. Basically, the system 300 for tape cartridge data protection interoperates with a tape cartridge is shown. The tape cartridge, e.g., tape cartridge 304, comprises a magnetic tape surrounded by a housing and a temperature indicator that signals a temperature of the tape cartridge. The system 300 comprises a storage 302 for holding a plurality of tape cartridges, of which tape cartridge 304 is shown with a reference numeral, a sensor 316 that detects temperature information from the temperature indicator of the tape cartridge, and a control unit 320 for controlling an actuator, e.g., a gripper 314 in combination with a tape robot, that performs an action depending on the detected temperature information.

The storage 302 may hold a plurality of tape cartridges 304 which may be optionally stacked one behind each other. A tape robot comprising at least a horizontal rail 308, a motor unit 310 for a horizontal movement, a vertical rail 312, and a gripper 314 may be used to select individual ones of the tape cartridges 304 from the storage 302 in order to insert them in one of the tape drives 306 shown in the top part of the figure. The controller 320 may be located, as shown, at a different location within the chassis (not shown).

The sensor 316 may be implemented as at least one barcode reader and/or at least one camera. One of the sensors 316 may be used explicitly for reading the barcode of the label of the tape cartridge 304; another sensor 316 may be used to read the thermochromic labels/field on the label 104 (not shown) of the tape cartridge 304. A skilled person in the art may recognize that it may be advantageous to use the same sensor 316 for doing both, reading the barcode and the temperature indicator.

Additionally, the tape library 300 may also comprise at least one climate chamber 318, however more than one climate chamber is easily possible. If the tape robot may be instructed to take a tape cartridge 304 from the storage 302 and inserted into one of the tape drives 306, the sensor 316 may detect that the temperature of the tape cartridge 304 is outside the specified range, as described above. In this case, the tape cartridge is not inserted into the tape drive 306 immediately, but into the climate chamber 318 until the temperature of the tape cartridge 314 selected has a temperature in a specified operation temperature range. Only then, the tape cartridge in the climate chamber 318 is moved from the climate chamber 318 to one of the tape drives 306 read and/or write operations.

It may be understood that also other types of tape library robots may be used instead of those working according to an X-Y-system.

FIG. 4 shows a block diagram of a front view 400 of an embodiment of the climate chamber 318. One or more tape cartridges 100 may be loadable to the climate chamber 318. Also shown are air exit areas 402. They are shown exemplary left and right to the tape cartridges 100, but may also be placed between the tape cartridges 100, or below and/or above the one or more tape cartridges 100. It may be noted that no extra frame is drawn to indicate a front side of the tape cartridge. Instead, it is assumed that the label (reference numeral 104 of FIG. 1) covers the complete front side of the tape cartridge 100.

FIG. 5 shows a block diagram of a top view 500 of an embodiment of the (opened) climate chamber 318. One or more tape cartridges 100 may be loaded from the front, in this perspective from the bottom side, of the climate chamber 318. From the back of the climate chamber 318 environmental air (indicated by arrows 502) may be sucked into the climate chamber 318. This may be done by one or more fans (not shown) in the heating/cooling device 504. The heating/cooling device 504 pushes (as indicated by arrows 506, 508) the heated or cooled air around the tape cartridge 100. The air may then exit through the air exit areas 402, indicated by arrows 510. The heating/cooling device 504 is operated in a way to bring the tape cartridge 100 into a temperature range specified for a proper operation. A decision regarding heating or cooling is determined by a detection of the status of the temperature indicator of the label of the tape cartridge.

Embodiments of the invention may be implemented together with virtually any type of computer, regardless of the platform being suitable for storing and/or executing program code.

FIG. 6 shows a block diagram 600 of the various components connected to a tape controller 602. It may be comparable to the controllers 320, shown in FIG. 3. The tape controller 602 may use at least signals from the sensor 316 for a detection and interpretation of the barcode of the label of the tape drive. The same sensor 316 may also deliver information about the thermochromic label/fields 202, 204, 206, 208, 210, 212 as indicated in FIG. 2. The tape controller may be adapted to operate the tape robot, indicated by the horizontal rail 308, the motor unit 310, the vertical rail 312, and the gripper 314. Additionally, the tape controller 602 is adapted to interoperate with the tape drives 306 as well as to operate/interoperate with the climate chamber 318. Optionally, the tape controller 602 may also be adapted to control an air condition system 604 in order to generate a proper climate in the storage 302 (compare FIG. 3).

FIG. 7 shows a block diagram of the method 700 for operating a system for tape cartridge data protection, the system interoperates with a tape cartridge. Also here, the tape cartridge comprises a magnetic tape surrounded by a housing and a temperature indicator that signals a temperature of the tape cartridge. The system (compare FIG. 3) to be operated comprises a storage for holding a tape cartridge, a sensor that detects temperature information from the temperature indicator of the tape cartridge, and a control unit of an actuator that performs an action depending on the detected temperature information. The method comprises selecting (step 702) a cartridge by the actuator controlled by the control unit, and detecting (step 704) a temperature of the cartridge by the sensor. Furthermore, the method 700 comprises, upon the temperature being in a predefined temperature range, moving (step 706) the cartridge into a tape drive, and upon the temperature being outside the predefined temperature range, moving (step 708) the cartridge into a climate chamber.

FIG. 8 shows, as an example, a computing system 800 suitable for executing program code related to the proposed method. The computing system may also be suited to be the tape control unit (compare 320, FIG. 3), at least in parts.

The computing system 800 is only one example of a suitable computer system and is not intended to suggest any limitation as to the scope of use or functionality of embodiments of the invention described herein, regardless, whether the computer system 800 is capable of being implemented and/or performing any of the functionality set forth hereinabove. In the computer system 800, there are components, which are operational with numerous other general purpose or special purpose computing system environments or configurations. Examples of well-known computing systems, environments, and/or configurations that may be suitable for use with computer system/server 800 include, but are not limited to, personal computer systems, server computer systems, thin clients, thick clients, hand-held or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like. Computer system/server 800 may be described in the general context of computer system-executable instructions, such as program modules, being executed by a computer system 800. Generally, program modules may include routines, programs, objects, components, logic, data structures, and so on that perform particular tasks or implement particular abstract data types. Computer system/server 800 may be practiced in distributed cloud computing environments where tasks are performed by remote processing devices that are linked through a communications network. In a distributed cloud computing environment, program modules may be located in both, local and remote computer system storage media including memory storage devices.

As shown in FIG. 8, computer system/server 800 is shown in the form of a general-purpose computing device. The components of computer system/server 800 may include, but are not limited to, one or more processors or processing units 802, a system memory 804, and a bus 806 that couple various system components including system memory 804 to the processor 802. Bus 806 represents one or more of any of several types of bus structures, including a memory bus or memory controller, a peripheral bus, an accelerated graphics port, and a processor or local bus using any of a variety of bus architectures. By way of example, and not limiting, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus. Computer system/server 800 typically includes a variety of computer system readable media. Such media may be any available media that is accessible by computer system/server 800, and it includes both, volatile and non-volatile media, removable and non-removable media.

The system memory 804 may include computer system readable media in the form of volatile memory, such as random access memory (RAM) 808 and/or cache memory 810. Computer system/server 800 may further include other removable/non-removable, volatile/non-volatile computer system storage media. By way of example only, a storage system 812 may be provided for reading from and writing to a non-removable, non-volatile magnetic media (not shown and typically called a 'hard drive'). Although not shown, a magnetic disk drive for reading from and writing to a removable, non-volatile magnetic disk (e.g., a 'floppy disk'), and an optical disk drive for reading from or writing to a removable, non-volatile optical disk such as a CD-ROM, DVD-ROM or other optical media may be provided. In such instances, each can be connected to bus 806 by one or more data media interfaces. As will be further depicted and described below, memory 804 may include at least one program product having a set (e.g., at least one) of program modules that are configured to carry out the functions of embodiments of the invention.

The program/utility, having a set (at least one) of program modules 816, may be stored in memory 804 by way of example, and not limiting, as well as an operating system, one or more application programs, other program modules, and program data. Each of the operating systems, one or more application programs, other program modules, and program data or some combination thereof, may include an implementation of a networking environment. Program modules 816 generally carry out the functions and/or methodologies of embodiments of the invention, as described herein.

The computer system/server 800 may also communicate with one or more external devices 818 such as a keyboard, a pointing device, a display 820, etc.; one or more devices that enable a user to interact with computer system/server 800; and/or any devices (e.g., network card, modem, etc.) that enable computer system/server 800 to communicate with one or more other computing devices. Such communication can occur via Input/Output (I/O) interfaces 814. Still yet, computer system/server 800 may communicate with one or more networks such as a local area network (LAN), a general wide area network (WAN), and/or a public network (e.g., the Internet) via network adapter 822. As depicted, network adapter 822 may communicate with the other components of computer system/server 800 via bus 806. It should be understood that although not shown, other hardware and/or software components could be used in conjunction with computer system/server 800. Examples include, but are not limited to: microcode, device drivers, redundant processing units, external disk drive arrays, RAID systems, tape drives, and data archival storage systems, etc.

The descriptions of the various embodiments of the present invention have been presented for purposes of illustration, but are not intended to be exhaustive or limited to the embodiments disclosed. Many modifications and variations will be apparent to those of ordinary skills in the art without departing from the scope and spirit of the described embodiments. The terminology used herein was chosen to best explain the principles of the embodiments, the practical application or technical improvement over technologies found in the marketplace, or to enable others of ordinary skills in the art to understand the embodiments disclosed herein.

The present invention may be embodied as a system, a method, and/or a computer program product. The computer program product may include a computer readable storage medium (or media) having computer readable program instructions thereon for causing a processor to carry out aspects of the present invention.

The medium may be an electronic, magnetic, optical, electromagnetic, infrared or a semi-conductor system for a propagation medium. Examples of a computer-readable medium may include a semi-conductor or solid state memory, magnetic tape, a removable computer diskette, a random access memory (RAM), a read-only memory (ROM), a rigid magnetic disk and an optical disk. Current examples of optical disks include compact disk-read only memory (CD-ROM), compact disk-read/write (CD-R/W), DVD and Blu-Ray-Disk.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object-oriented programming language such as Smalltalk, C++ or the like, and conventional procedural programming languages, such as the "C" programming language or similar programming languages. The computer readable program instructions may execute entirely on the user's computer, partly on the user's computer as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus', and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus', or another devices to cause a series of operational steps to be performed on the computer, other programmable apparatus or other device to produce a computer implemented process, such that the instructions which execute on the computer, other programmable apparatus', or another device implement the functions/acts specified in the flowchart and/or block diagram block or blocks.

The flowcharts and/or block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or act or carry out combinations of special purpose hardware and computer instructions.

The terminology used herein is for the purpose of describing particular embodiments only and is not intended to limit the invention. As used herein, the singular forms "a", "an" and "the" are intended to include the plural forms as well, unless the context clearly indicates otherwise. It will further be understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or steps plus function elements in the claims below are intended to include any structure, material, or act for performing the function in combination with other claimed elements, as specifically claimed. The description of the present invention has been presented for purposes of illustration and description, but is not intended to be exhaustive or limited to the invention in the form disclosed. Many modifications and variations will be apparent to those of ordinary skills in the art without departing from the scope and spirit of the invention. The embodiments are chosen and described in order to best explain the principles of the invention and the practical application, and to enable others of ordinary skills in the art to understand the invention for various embodiments with various modifications, as are suited to the particular use contemplated.

What is claimed is:

1. A tape cartridge for a magnetic tape, the tape cartridge comprising:
   a magnetic tape surrounded by a housing; and
   a temperature indicator that signals a temperature of the tape cartridge, wherein the temperature indicator is a temperature sensitive sticker attached to the tape cartridge, wherein the temperature sensitive sticker changes color depending on the temperature, and wherein the temperature sensitive sticker depicts different barcodes depending on the temperature.

2. The tape cartridge according to claim 1, wherein the temperature indicator signals two statuses relating to at least two temperature ranges.

3. The tape cartridge according to claim 1, wherein the temperature indicator signals three temperature ranges.

4. The tape cartridge according to claim 1, wherein the tape cartridge is of type Linear Tape-Open (LTO).

5. The tape cartridge according to claim 1, further comprising:
   a humidity sticker that signals humidity information.

6. A system for tape cartridge data protection that interoperates with a tape cartridge, the tape cartridge comprising a magnetic tape surrounded by a housing and a temperature indicator that signals a temperature of the tape cartridge, the system comprising:
   a storage for holding a tape cartridge;
   a sensor that detects temperature information from the temperature indicator of the tape cartridge;
   a climate chamber; and
   a control unit for controlling an actuator that performs an action depending on the detected temperature information, wherein the actuator moves the tape cartridge into the climate chamber if the detected temperature is outside a predefined temperature range.

7. The system according to claim 6, wherein the sensor is a camera and a barcode reader.

8. The system according to claim 6, wherein the storage is a component of a tape library.

9. The system according to claim 6, wherein the sensor is integrated into a gripper of a tape library.

10. The system according to claim 6, wherein the sensor further detects humidity information from a humidity sticker attached to the cartridge; and wherein the control unit further performs the action depending on a combination of the detected temperature information and the detected humidity information.

11. A method for operating a system for tape cartridge data protection, the system interoperates with a tape cartridge, the tape cartridge comprising a magnetic tape surrounded by a housing and a temperature indicator for signaling a temperature of the tape cartridge, the system comprising:

a storage for holding a tape cartridge;

a sensor that detects temperature information from the temperature indicator of the tape cartridge;

a control unit of an actuator that performs an action depending on the detected temperature information; and wherein the method comprises:

selecting a cartridge by the actuator controlled by the control unit;

detecting a temperature of the cartridge by the sensor;

upon the temperature being in a predefined temperature range, moving the tape cartridge into a tape drive; and upon the temperature being outside the predefined temperature range, moving the cartridge into a climate chamber.

12. The method according to claim 11, wherein the tape drive and the climate chamber are part of a tape library.

13. The method according to claim 11, further comprising:

determining whether the detected temperature is below or above the predefined temperature range.

14. The method according to claim 11, further comprising:

upon receiving an urgency signal, interrupting the moving the cartridge into a climate chamber, and moving the cartridge directly into the tape drive.

15. The method according to claim 11, further comprising:

determining, after an adaptable delay, whether the temperature of the tape cartridge in the climate chamber is still outside the predefined temperature range.

16. The method according to claim 11, wherein the sensor further detects humidity information from a humidity sticker attached to the cartridge; and wherein the control unit further performs the action depending on a combination of the detected temperature information and the detected humidity information.

* * * * *